(12) United States Patent
Kellerman

(10) Patent No.: US 9,352,738 B2
(45) Date of Patent: May 31, 2016

(54) DUAL CLUTCH POWERTRAIN ARCHITECTURE

(71) Applicant: Allison Transmission, Inc., Indianapolis, IN (US)

(72) Inventor: Jonathan Kellerman, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 409 days.

(21) Appl. No.: 13/955,567

(22) Filed: Jul. 31, 2013

(65) Prior Publication Data

US 2015/0038293 A1    Feb. 5, 2015

(51) Int. Cl.
| | |
|---|---|
| *B60W 10/02* | (2006.01) |
| *B60W 10/06* | (2006.01) |
| *B60W 10/10* | (2012.01) |
| *B60K 6/48* | (2007.10) |
| *B60W 10/30* | (2006.01) |
| *F16D 39/00* | (2006.01) |
| *B60K 25/00* | (2006.01) |

(52) U.S. Cl.
CPC .................. *B60W 10/02* (2013.01); *B60K 6/48* (2013.01); *B60W 10/026* (2013.01); *B60W 10/06* (2013.01); *B60W 10/10* (2013.01); *B60W 10/30* (2013.01); *F16D 39/00* (2013.01); *B60K 2025/005* (2013.01); *B60W 2510/06* (2013.01); *B60Y 2400/428* (2013.01); *Y02T 10/6221* (2013.01); *Y10T 477/6403* (2015.01)

(58) Field of Classification Search
CPC ... B60W 10/02; B60W 10/026; B60W 10/30; Y10T 477/26; Y10T 477/27; Y10T 477/73; Y10T 477/6403
See application file for complete search history.

(56) References Cited

U.S. PATENT DOCUMENTS

| | | | |
|---|---|---|---|
| 5,176,588 | A | 1/1993 | Sackschewsky |
| 5,616,091 | A | 4/1997 | Warren |
| 5,789,823 | A | 8/1998 | Sherman |
| 5,967,927 | A | 10/1999 | Imamura et al. |
| 6,024,667 | A | 2/2000 | Krohm et al. |
| 6,183,389 | B1 | 2/2001 | Tabata |
| 6,428,438 | B1 | 8/2002 | Bowen |
| 6,561,938 | B1 | 5/2003 | Kurner et al. |

(Continued)

FOREIGN PATENT DOCUMENTS

WO    WO 2012017531 A1 * 2/2012

OTHER PUBLICATIONS

PCT/US2014/047587, International Searching Authority, Written Opinion of the International Searching Authority, Nov. 20, 2014.

(Continued)

*Primary Examiner* — Huan Le
(74) *Attorney, Agent, or Firm* — Ice Miller LLP

(57) ABSTRACT

A powertrain architecture includes an engine and a transmission coupled through a launch device that is configured to be selectively mechanically coupled to the engine and to the transmission. A ring gear is positioned at least partially around the launch device. An engine lock up clutch mechanically couples the engine to the ring gear. A turbine lock up clutch mechanically couples the launch device to the ring gear. Ancillary devices are provided to receive power from or transmit power to the ring gear. The engine lock up clutch and the turbine lock up clutch selectively engage the ring gear to power at least one ancillary device.

29 Claims, 14 Drawing Sheets

(56) References Cited

U.S. PATENT DOCUMENTS

| | | | |
|---|---|---|---|
| 6,565,471 | B2 | 5/2003 | Weeramantry et al. |
| 6,595,895 | B2 | 7/2003 | Suzuki et al. |
| 6,607,467 | B2 | 8/2003 | Tabata |
| 6,709,362 | B2 | 3/2004 | Tomohiro et al. |
| 6,752,741 | B2 | 6/2004 | Kahlon et al. |
| 6,799,109 | B2 | 9/2004 | Nakamori et al. |
| 6,817,965 | B2 | 11/2004 | Tabata |
| 6,819,997 | B2 | 11/2004 | Buchanan et al. |
| 6,921,984 | B2 | 7/2005 | Rogg |
| 7,093,517 | B2 | 8/2006 | Hanyu et al. |
| 7,154,236 | B1 | 12/2006 | Heap |
| 7,166,049 | B2 | 1/2007 | Saller |
| 7,252,620 | B2 | 8/2007 | Kiuchi |
| 7,272,987 | B2 | 9/2007 | Hughes |
| 7,282,011 | B2 | 10/2007 | Tabata et al. |
| 7,306,544 | B2 | 12/2007 | Matsumura et al. |
| 7,347,803 | B2 | 3/2008 | Kobayashi et al. |
| 7,351,182 | B2 | 4/2008 | Kobayashi |
| 7,367,910 | B2 | 5/2008 | Schmidt |
| 7,500,929 | B2 | 3/2009 | Menne et al. |
| 7,524,266 | B2 | 4/2009 | Nobumoto et al. |
| 7,544,151 | B2 | 6/2009 | Zettel et al. |
| 7,686,112 | B2 | 3/2010 | Shiiba |
| 7,706,949 | B2 | 4/2010 | Sah et al. |
| 7,708,095 | B2 | 5/2010 | Hirata |
| 7,753,149 | B2 | 7/2010 | Tabata et al. |
| 7,758,467 | B2 | 7/2010 | Ashizawa et al. |
| 7,803,082 | B2 | 9/2010 | Diosi et al. |
| 7,846,051 | B2 | 12/2010 | Holmes et al. |
| 7,874,956 | B2 | 1/2011 | Kouno |
| 7,885,737 | B2 | 2/2011 | Hirata et al. |
| 7,953,533 | B2 | 5/2011 | Tsuda |
| 7,954,581 | B2 | 6/2011 | Tanishima |
| 7,963,191 | B2 | 6/2011 | Holmes |
| 7,998,023 | B2 | 8/2011 | Holmes et al. |
| 8,056,663 | B2 | 11/2011 | Schoenek |
| 8,065,047 | B2 | 11/2011 | Hasegawa et al. |
| 8,070,649 | B2 | 12/2011 | Holmes |
| 8,123,656 | B2 | 2/2012 | Schoenek et al. |
| 8,147,373 | B2 | 4/2012 | Soliman et al. |
| 8,147,375 | B2 | 4/2012 | Sah |
| 8,187,146 | B2 | 5/2012 | Allgaier et al. |
| 8,192,324 | B2 | 6/2012 | Kraska et al. |
| 8,195,352 | B2 | 6/2012 | Morris |
| 8,216,112 | B2 | 7/2012 | Gibson et al. |
| 8,220,606 | B2 | 7/2012 | Dreher |
| 8,221,285 | B2 | 7/2012 | Heap et al. |
| 8,225,915 | B2 | 7/2012 | Ames et al. |
| 8,226,516 | B2 | 7/2012 | Swales et al. |
| 8,226,526 | B2 | 7/2012 | Czoykowski et al. |
| 8,246,500 | B2 | 8/2012 | Eto et al. |
| 8,262,537 | B2 | 9/2012 | Yang et al. |
| 8,287,427 | B2 | 10/2012 | Sah et al. |
| 8,298,117 | B2 | 10/2012 | Seel et al. |
| 8,328,687 | B2 | 12/2012 | Gibson et al. |
| 8,333,680 | B2 | 12/2012 | Kasuya et al. |
| 8,353,804 | B2 | 1/2013 | Versteyhe et al. |
| 8,364,364 | B1 | 1/2013 | Tao et al. |
| 8,370,014 | B2 | 2/2013 | Ueno |
| 8,376,905 | B2 | 2/2013 | Kasuya et al. |
| 8,382,624 | B2 | 2/2013 | Li et al. |
| 8,388,494 | B2 | 3/2013 | Schiele et al. |
| 8,403,791 | B2 | 3/2013 | Long et al. |
| 2005/0101432 | A1 | 5/2005 | Pels et al. |
| 2010/0248892 | A1 | 9/2010 | Sah |
| 2010/0248893 | A1 | 9/2010 | Shimanaka |
| 2011/0034299 | A1 | 2/2011 | Nakamura et al. |
| 2011/0136621 | A1 | 6/2011 | Nedorezov et al. |
| 2011/0245034 | A1 | 10/2011 | Yoshida et al. |
| 2011/0263379 | A1 | 10/2011 | Liang et al. |
| 2012/0010045 | A1 | 1/2012 | Nedorezov et al. |
| 2012/0053012 | A1 | 3/2012 | Yamada et al. |
| 2012/0065017 | A1 | 3/2012 | Yamada |
| 2012/0071294 | A1 | 3/2012 | Ishikawa |
| 2012/0083388 | A1 | 4/2012 | Watanabe et al. |
| 2012/0088629 | A1 | 4/2012 | Aoyama et al. |
| 2012/0108385 | A1 | 5/2012 | Sano et al. |
| 2012/0115679 | A1 | 5/2012 | Doering et al. |
| 2012/0135839 | A1 | 5/2012 | Watanabe et al. |
| 2012/0135840 | A1 | 5/2012 | Tatewaki et al. |
| 2012/0135841 | A1 | 5/2012 | Watanabe et al. |
| 2012/0142494 | A1 | 6/2012 | Yamada et al. |
| 2012/0202646 | A1 | 8/2012 | Suzuki et al. |
| 2012/0258838 | A1 | 10/2012 | Hartz et al. |
| 2012/0264565 | A1 | 10/2012 | Kobayashi |
| 2012/0289376 | A1 | 11/2012 | Yang et al. |
| 2012/0302402 | A1 | 11/2012 | Waku et al. |
| 2012/0309587 | A1 | 12/2012 | Nozaki |
| 2012/0330522 | A1 | 12/2012 | Gibson et al. |
| 2013/0005532 | A1 | 1/2013 | Gibson et al. |
| 2013/0012353 | A1 | 1/2013 | Yoshida et al. |
| 2013/0030624 | A1 | 1/2013 | Suyama et al. |
| 2013/0040778 | A1 | 2/2013 | Schulte et al. |
| 2013/0053214 | A1 | 2/2013 | Kawai et al. |
| 2013/0085035 | A1 | 4/2013 | Gibson et al. |
| 2013/0196817 | A1* | 8/2013 | Miyazaki et al. ................. 477/5 |
| 2013/0297157 | A1 | 11/2013 | Pietron et al. |

OTHER PUBLICATIONS

PCT/US2014/047587, International Searching Authority, International Search Report, Nov. 13, 2014.

PCT/US2014/047587, International Bureau, International Preliminary Report on Patentability, Feb. 11, 2016.

\* cited by examiner

DUAL CLUTCH POWERTRAIN ARCHITECTURE

TECHNICAL FIELD OF THE DISCLOSED EMBODIMENTS

The embodiments disclosed herein related to a powertrain architecture and, more particularly, to a dual clutch system for a powertrain architecture.

BACKGROUND OF THE DISCLOSED EMBODIMENTS

Vehicle powertrain systems are being designed to increase fuel economy and reduce carbon emissions. Hybrid engines are being incorporated into many vehicles to accomplish these tasks. Unfortunately, the market is currently rejecting many hybrid vehicle models because the vehicles provide little return on investment. Particularly, many of these models incorporate recovered energy systems. Recovered energy systems are difficult and expensive to integrate into the vehicle. As a result, the costs of hybrid vehicles are significantly higher than the cost of an equivalent non-hybrid make and model. Additionally, hybrid systems are difficult to maintain, which further increases the costs associated with owning a hybrid. The expenses associated with purchasing and maintaining a hybrid vehicle typically are not offset by the reduction of fuel costs associated with the increased fuel economy of the hybrid vehicle, There are several possible energy sources within a. vehicle, Fuel energy and low voltage energy systems are the most common sources of energy to power the vehicle. However, these sources increase the fuel consumption of the vehicle. Currently, the automotive industry is shifting away from relying on fuel energy to accomplish increased fuel economy. Recovered energy systems, as described above, effectively reduce fuel consumption, but do so at an increased cost of manufacturing and maintenance. An additional source of power within the vehicle comes from the kinetic and potential energy of the vehicle, i.e. energy created by the rotation of the vehicle's wheels when power from the transmission is not being applied to the wheels. Most vehicles fail to capture the kinetic and potential energy of the vehicle and this energy generally goes to waste.

SUMMARY OF THE DISCLOSED EMBODIMENTS

In one embodiment, a powertrain architecture includes an engine and a launch device having a turbine configured to be selectively mechanically coupled to the engine to receive power from the engine. A ring gear is positioned around the launch device. An engine lock up clutch mechanically couples the engine to the ring gear. A turbine lock up clutch mechanically couples the turbine of the launch device to the ring gear. Ancillary devices at least one of receive power from or transmit power to the ring gear. The engine lock up clutch and the turbine lock up clutch selectively engage the ring gear to power at (east some of the ancillary devices.

In one embodiment, a dual lock up clutch is provided. The dual lock up clutch includes a ring gear positioned around a launch device. An engine lock up clutch mechanically couples an engine of the powertrain architecture to the ring gear. A turbine lock up clutch mechanically couples a turbine of the launch device to the ring gear. Ancillary devices at least one of receive power from or transmit power to the ring gear. The engine lock up clutch and the turbine lock up clutch selectively engage the ring gear to power at least some of the ancillary devices.

In one embodiment, a method of powering ancillary devices of a vehicle is provided. The method includes providing a ring gear positioned around a launch device of the vehicle. An engine lock up clutch is provided to mechanically couple an engine to the ring gear. A turbine lock up clutch is provided to mechanically couple a turbine of the launch device to the ring gear. The method also includes selectively engaging the engine lock up clutch and the turbine lock up clutch to the ring gear to power at least some of ancillary devices of the vehicle.

Other embodiments are also disclosed.

BRIEF DESCRIPTION OF DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawing, wherein.

DETAILED DESCRIPTION OF THE DISCLOSED EMBODIMENTS

Figure 1:
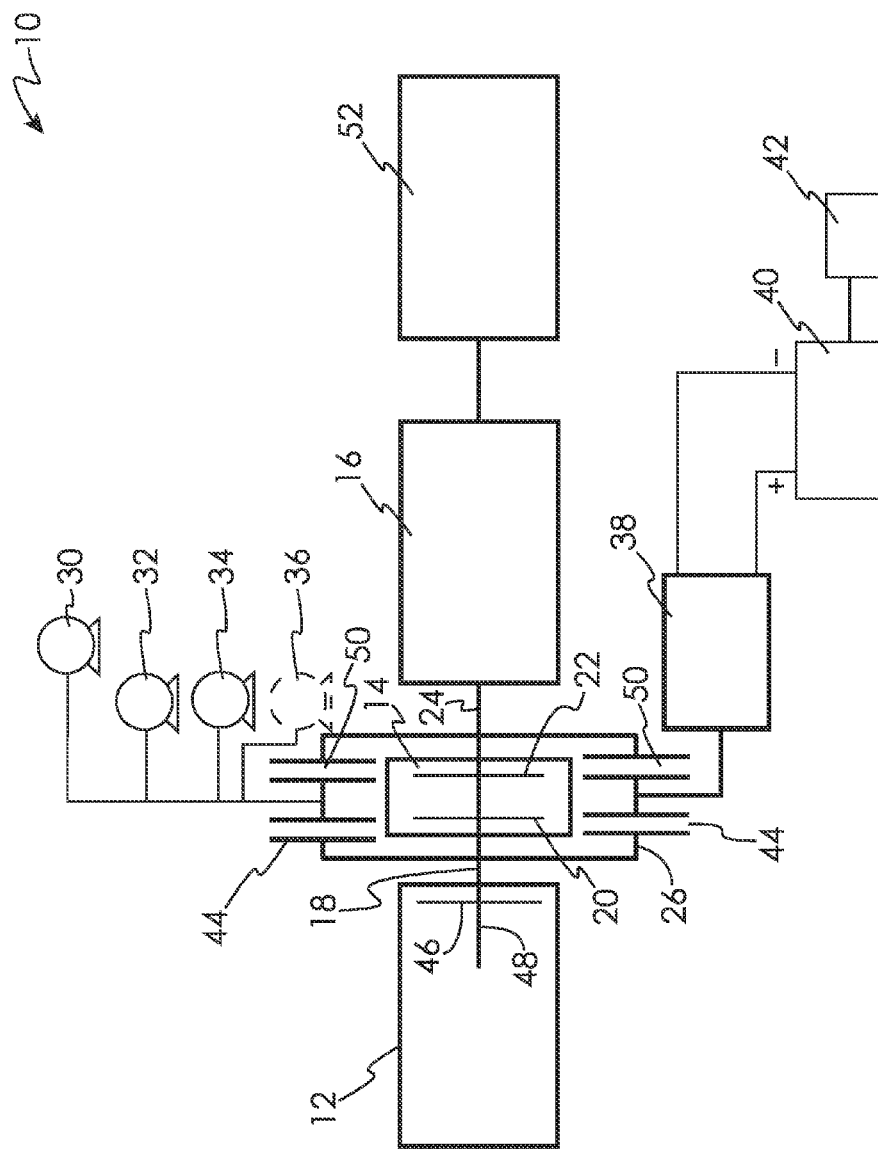
FIG. 1 is a schematic illustration of a powertrain architecture formed in accordance with an embodiment.

The features and advantages of this disclosure, and the manner of attaining them, will be more apparent and better understood by reference to the following descriptions of the disclosed methods and systems, taken in conjunction with the accompanying drawings. The components in the figures are not necessarily to scale, emphasis instead being placed upon illustrating the principles of the disclosure. Moreover, in the figures like referenced numerals designate corresponding parts throughout the different views, but not all reference numerals are shown in each of the figures.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. Alterations and modifications in the illustrated device, and further applications of the principles of the invention as illustrated therein, as would normally occur to one skilled in the art to which the invention relates are contemplated, are desired to be protected. Such alternative embodiments require certain adaptations to the embodiments discussed herein that would be obvious to those skilled in the art.

Disclosed herein is a powertrain architecture for a vehicle, wherein the architecture includes an engine and a transmission coupled through a launch device configured to be selectively mechanically coupled to the engine and to the transmission, in one embodiment, the launch device comprises a torque converter having an impeller that is mechanically coupled to the engine and a turbine that is mechanically coupled to the transmission. A ring gear is positioned around the launch device. It should be noted that in other embodiments, the ring gear may be replaced with a belt system, a chain drive, or any other suitable mechanism for coupling to the engine and/or the transmission. An engine lock up clutch selectively mechanically couples the engine to the ring gear, and a turbine lock up clutch selectively mechanically couples the turbine of the launch device to the ring gear. In one embodiment, the transmission may be coupled to the ring gear via a countershaft. Alternatively, the transmission may be coupled to the ring gear via an output shaft. Ancillary devices receive power from or transmit power to the ring gear. The engine lock up clutch and the turbine lock up clutch selectively engage the ring gear to power at least some of the ancillary devices. In one embodiment, during a driving operation, the engine lock up clutch and the turbine lock up clutch are both mechanically coupled to the ring gear to transmit power from the engine to the ancillary devices and to the transmission. In one embodiment, during an engine on at stop operation, the engine lock up clutch mechanically couples the engine to the ring gear and the turbine lock up clutch is decoupled from the ring gear to transmit power from the engine to the ancillary devices, but not to the transmission. In one embodiment, during an engine off at stop operation, the engine lock up clutch and the turbine lock up clutch are decoupled from the ring gear so that power from a low voltage energy storage may be transmitted through the ring gear to the ancillary devices. In one embodiment, during an engine, off at speed operation, the engine lock up clutch is decoupled from the ring gear and the turbine lock up clutch mechanically couples the transmission to the ring gear to transmit kinetic energy from the wheels, through the transmission, and to the ancillary devices. In one embodiment, the potential energy of the vehicle is converted to kinetic energy in the wheels and transmitted through the transmission and the ring gear to the ancillary devices. In one embodiment, a stationary electric Power Takeoff (PTO) mode may be utilized, wherein the system runs the ring in neutral powered by an electrical auxiliary power source (fuel cell) for stationary AC and mild hydraulic power.

In one embodiment, the ancillary devices include an input accessory motor mechanically coupled to the ring gear, a low voltage energy storage electrically coupled to the input accessory motor, low voltage electronics electrically coupled to the low voltage energy storage, and a turbocharger motor and an exhaust system heater electrically coupled to the input accessory motor and to the low voltage energy storage. In such an embodiment, during an acceleration operation, the engine lock up clutch and the turbine lock up clutch mechanically couple the engine and the transmission to the ring gear to transmit power from the engine to the transmission and the ancillary devices. During a cruise operation, the engine lock up clutch and the turbine lock up clutch mechanically couple the engine and the transmission to the ring gear to transmit power from the engine to the transmission and the ancillary devices, The cruise operation further transmits power from the turbocharger motor to the to the transmission. During an engine off while moving operation, the turbine lock up clutch mechanically couples the transmission to the ring gear and the engine lock up clutch is decoupled from the ring gear to transmit kinetic energy from the transmission to the low voltage electronics and the exhaust system heater via the input accessory motor. The engine off while moving operation further transmits kinetic energy from the transmission to the ancillary devices.

FIG. 1 is a schematic view of a powertrain architecture 10 having an engine 12, a launch device 14, and transmission 16. The engine 12 may be any suitable engine for powering a vehicle (not shown), for example, a truck, a bus, an automobile, or the like. The engine 12 includes a crankshaft 48 and a flywheel 46 that are caused to rotate by combustion within the engine 12. An output shaft 18 of the engine 12 is mechanically coupled to the launch device 14, In an exemplary embodiment, the launch device 14 is a torque converter used to transfer rotating power from the engine 12 to the transmission 16. An impeller 20 of the torque converter is mechanically coupled to the engine 12. and a turbine 22 of the torque converter is mechanically coupled to the transmission 16, as is known in the art. In particular, an input shaft 24 of the transmission 16 is mechanically coupled to turbine 22 to receive power therefrom during normal powered operation of the powertrain 10, whereby the engine 12 delivers power to the transmission 36 and the transmission 16 delivers the power to a driveline output 52 that is coupled to wheels (not shown) of the vehicle.

A ring gear 26 at least partially surrounds the launch device 14. The ring gear 26 is mechanically coupled to a plurality of ancillary devices. The ancillary devices include, but are not limited to, a transmission pump 30, an air brake compressor 32, a power steering pump 34, and an HVAC compressor 36. Additionally, the ancillary devices include an input accessory motor 38 mechanically coupled to the ring gear 26. A low voltage energy storage 40, for example a battery, is electrically coupled to the input accessory motor 38. Each of the ancillary devices may be independently clutched in some embodiments to enable selective operation of the devices. In one embodiment, the input accessory motor 38 may be an insulated gate bipolar transistor 3-phase motor. Alternatively, the input accessory motor 38 may be replaced by a full hybrid system. Low voltage electronics 42 within the vehicle are powered by the low voltage energy storage 40.

A pair of lock up clutches are configured to selectively engage the ring gear 26 to alter a power source for the low voltage electronics 42 and the ancillary devices. An engine lock up clutch 44 selectively mechanically couples the ring gear 26 to the flywheel 46 (or other appropriate portion) of the engine 12, Additionally, a turbine lock up clutch 50 selectively mechanically couples the ring gear 26 to the turbine 22 of the launch device 14 (or other appropriate portion of the transmission). The embodiments described below illustrate the various configurations in which the low voltage electronics 42 and the ancillary devices are powered by the powertrain architecture 10. A transmission electronic control module (not shown) may be utilized to control the engine lock up clutch 44 and the turbine lock up clutch 50 to select the power source of the powertrain architecture 10. It will be appreciated that providing the ring gear 26 to power the ancillary devices eliminates the need for the accessory belt and starter ring included on the fore end of most prior art engines. Eliminating the accessory belt and starter ring from the system provides room within the vehicle package for the added components of the powertrain architecture 10.

Figure 2:
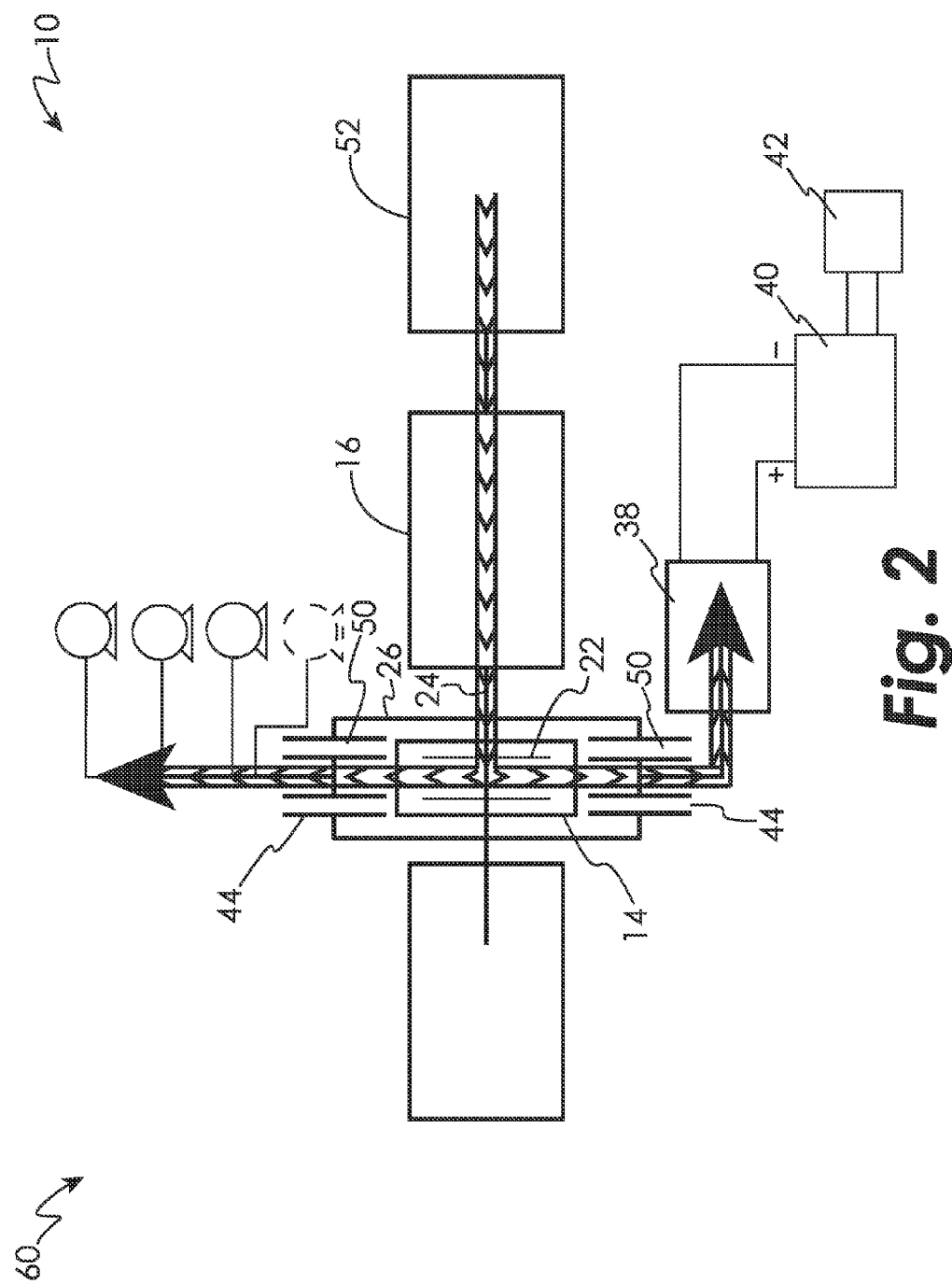
FIG. 2 is a schematic illustration of the powertrain architecture shown in FIG. 1 showing power flows during an engine off at speed operation.

FIG. 2 is a schematic illustration of the powertrain architecture 10 during an engine off at speed operation 60. The engine off at speed operation 60 occurs when the vehicle is descending a grade but engine braking is not commanded (either automatically, such as when indicated by an inclinometer or, alternatively, manually by the operator of the vehicle). During the engine off at speed operation 60, the engine lock up clutch 44 is decoupled from the ring gear 26, and the turbine lock up clutch 50 is engaged to couple the transmission 16 to the ring gear 26. In the engine off at speed operation 60, kinetic energy from the transmission 16 is utilized to power the low voltage electronics 42 (through the input accessory motor 38 acting as a generator) and the vehicle ancillary devices, while the engine is off and uncoupled from the transmission 16 and from the vehicle ancillary devices, in particular, the rotation of the vehicle's wheels transmits kinetic energy to the transmission 16, which thereby rotates the input shaft 24 of the transmission 16. This energy is transmitted through the turbine 22 of the launch device 14 to the ring gear 26 (by operation of the turbine lockup clutch 50), causing the ring gear 26 to rotate. The rotation of the ring gear 26 transmits the kinetic energy to the ancillary devices and the input accessory motor 38 as mechanical rotational energy. The rotation of the input accessory motor 38 thereby generates electrical power that is provided to the low voltage energy storage 40. The power transmitted to the low voltage energy storage 40 may be stored therein and/or utilized to power the low voltage electronics 42.

In the engine off at speed operation 60, the fueling to the engine is stopped and the vehicle kinetic energy takes over as the vehicle power source. Uncoupling the engine 12 via the engine lockup clutch 44 eliminates engine losses that would otherwise use kinetic energy to cause rotation of the unfueled engine 12. Because prior art systems do not have the ability to uncouple the engine from the launch device 14, attempts have been made to minimize the drain on kinetic energy caused by rotating the unfueled engine by opening all of the engine valves. However, this causes cooling of the exhaust system and the concomitant requirement for additional fueling to heat the exhaust system components to meet exhaust emissions requirements, In the engine off at speed operation 60, engine losses can be eliminated while not cooling the exhaust system. The engine off at speed operation 60 also provides complete controllability and meets all accessory load requirements, including driver comfort (e.g., operation of the HVAC compressor 36).

Figure 3:
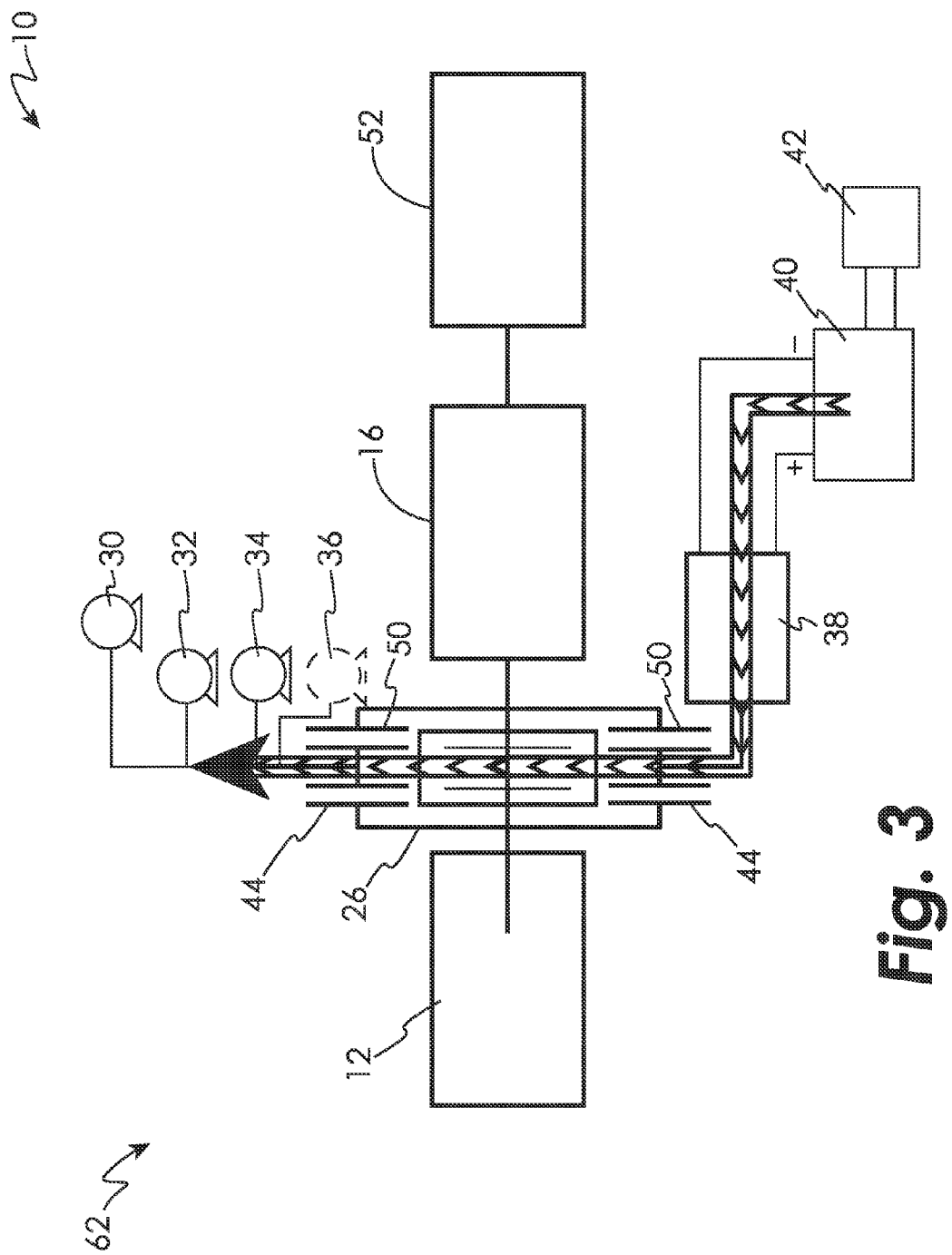
FIG. 3 is a schematic illustration of the powertrain architecture shown in FIG. 1 showing power flows during an engine off at stop operation.

FIG. 3 is a schematic illustration of the powertrain architecture 10 during an engine off at stop operation 62. During the engine off at stop operation 62, the vehicle is stopped and the engine 12 is off; however, the low voltage electronics 42 and the ancillary devices are still powered by the low voltage energy storage 40. The engine off at stop operation may also occur when an engine start/stop system is being used to save fuel and emissions by turning the engine 12 off when the vehicle comes to a stop, During the engine off at stop operation 62, the engine lock up clutch 44 and the turbine lock up clutch 50 are both decoupled from the ring gear 26. The low voltage energy storage 40 provides electrical current to the low voltage electronics 42 to power the low voltage electronics 42 while the engine 12 is turned off. Furthermore, the low voltage energy storage 40 provides electrical current to power the input accessory motor 38. The input accessory motor 38 rotates the ring gear 26 to provide mechanical power to the transmission pump 30. air brake compressor 32, power steering 34, and HVAC compressor 36 (and any other vehicle ancillary devices) so that these devices may be operational while the engine is turned off. It should be noted that other devices within the vehicle may be operated by the low voltage energy storage 40 during the engine off at stop operation 62.

In some embodiments, the powertrain architecture 10 is in the engine off at stop operation 62 because an engine control module and/or transmission control module (not shown) have temporarily shut down the engine when the vehicle is not moving, such as at a stop light. There is often provision made for the driver to override the engine stop, which often happens because the vehicle HVAC compressor is not powered during engine stop in prior art systems. Accordingly, the ability in some of the presently disclosed embodiments to power the HVAC compressor 36 during the engine off at stop operation 62 reduces the incentive for the driver to override the engine stop, thereby increasing fuel efficiency and reducing exhaust emissions. The engine off at stop operation 62 also powers the transmission pump 30, which allows for hill hold capability without a hill start assist system. Additionally, providing power to the power steering pump 34 prevents the typical "jerk" when the wheel is turned and the engine is stopped. Additionally, the driver is allowed to change wheel direction during the engine off at stop operation 62, which would not be possible in some large vehicles such as buses using prior art systems.

In the engine off at stop operation 62, the engine is started via the input accessory motor 38. The prior art alternator, electric transmission pressure pump, and starter are all consolidated into one electric machine allowing the separate starter to he eliminated. Because the input accessory motor 38 is rotating, the ring gear 26, the engine 12 may be started by coupling it to the ring gear 26.

Figure 4:
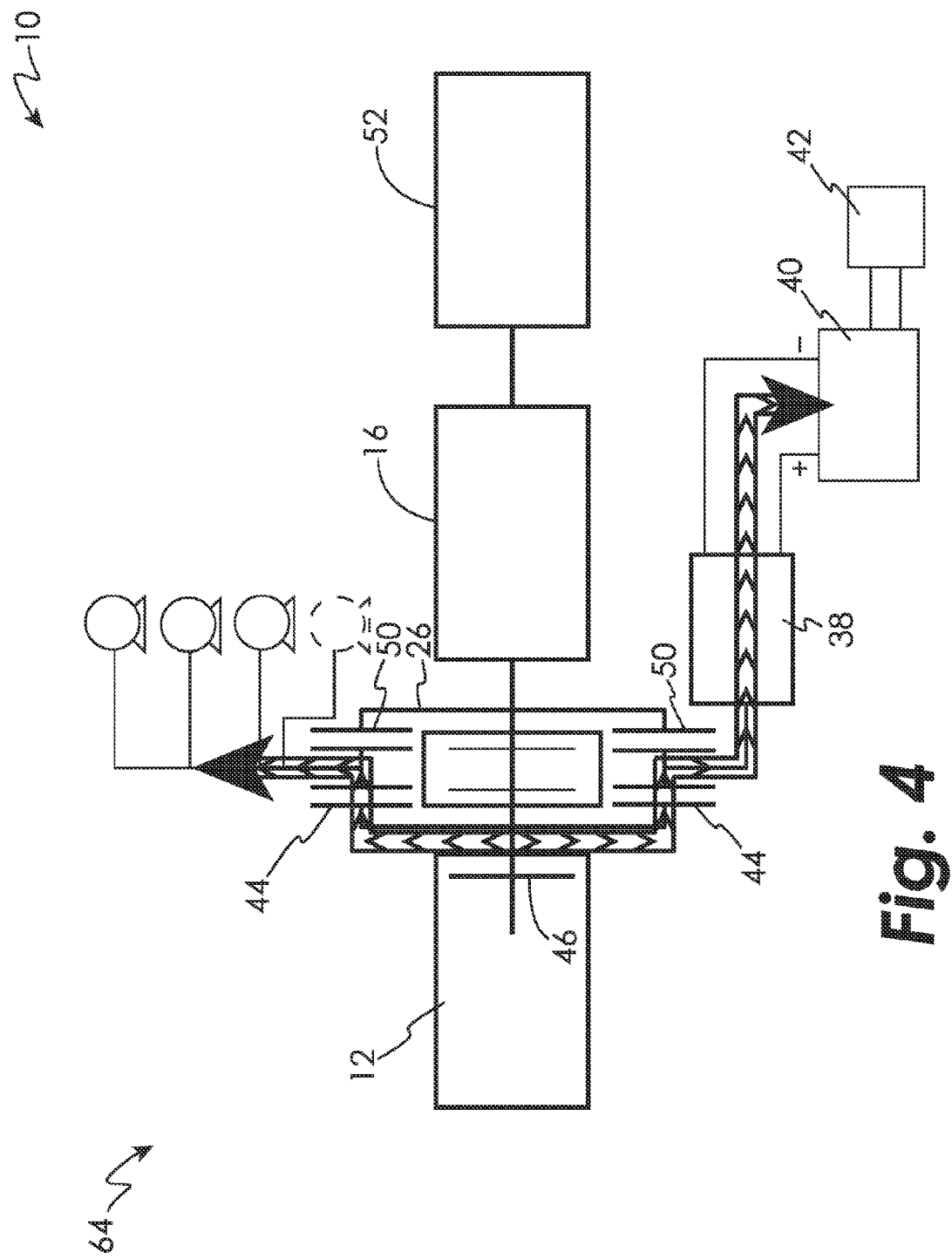
FIG. 4 is a schematic illustration of the powertrain architecture shown in FIG. 1 showing power flows during an engine on at stop operation.

FIG. 4 is a schematic illustration of the powertrain architecture 10 during an engine on at stop operation 64. The engine on at stop operation 64 occurs when the vehicle is stopped and the engine 12 is fueled and running. During the engine on at stop operation 64, the engine lock up clutch 44 is coupled to the ring gear 26, and the turbine lock up clutch 50 is decoupled from the ring gear 26. The engine 12 transmits power from the flywheel 46 to the ring gear 26, thereby causing rotation of the ring gear 26 which mechanically powers the vehicle ancillary devices. The ring gear 26 additionally provides power to the input accessory motor 38, which in turn generates electrical energy that is provided to the low voltage energy storage 40. The low voltage energy storage 40 may store this power and/or utilize the power to electrically drive the low voltage electronics 42. It will be appreciated that the transmission 16, and hence the vehicle wheels, are uncoupled from the engine 12 during the engine on at stop operation 64.

Figure 5:
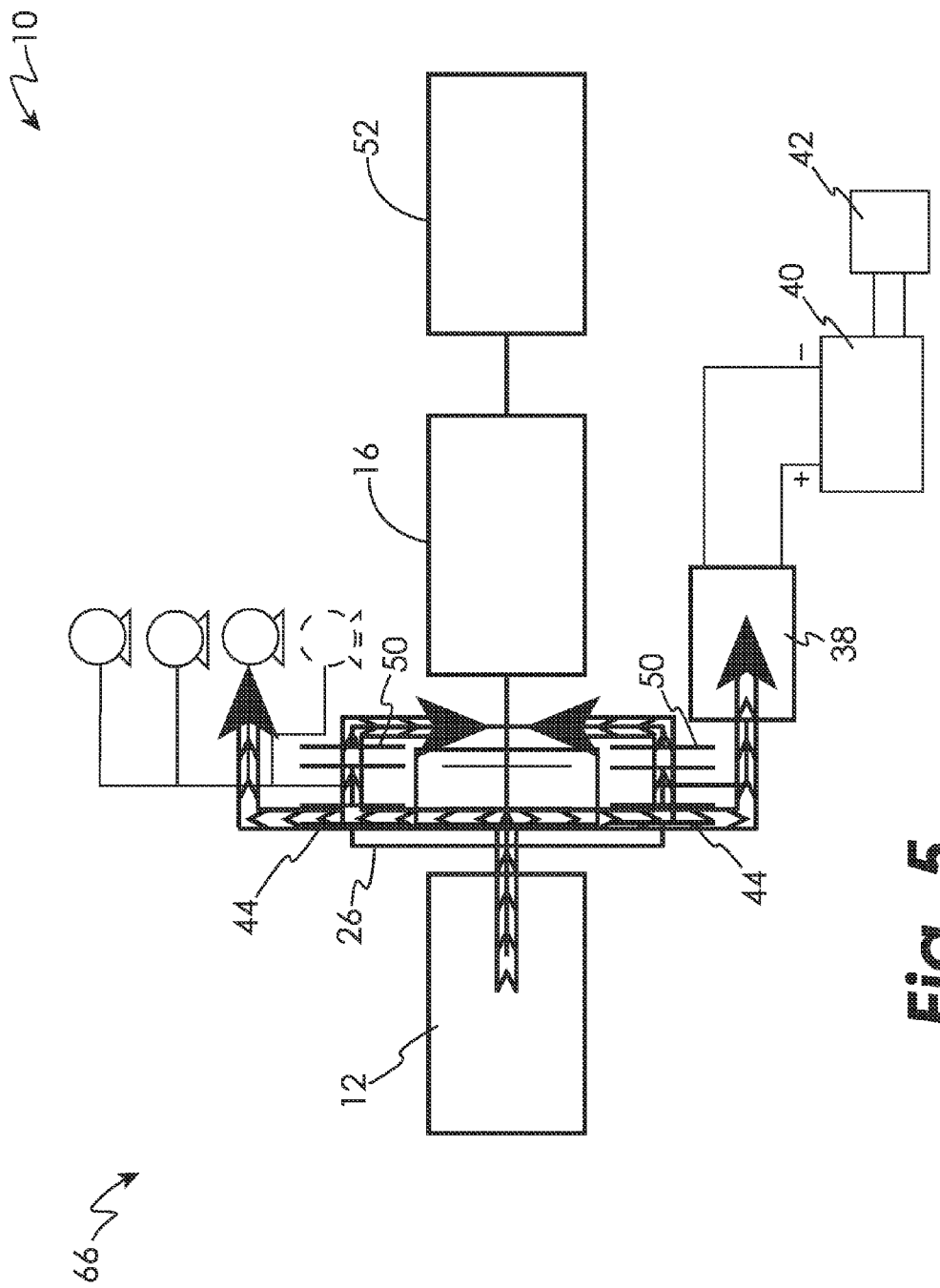
FIG. 5 is a schematic illustration of the powertrain architecture shown in FIG. 1 showing power flows during a driving operation.

FIG. 5 is a schematic illustration of the powertrain architecture 10 during a driving operation 66. The driving operation 66 includes scenarios where the vehicle is accelerating, cruising, or climbing, or any other operation requiring the engine to be on and fueled. During the driving operation 66, the engine lock up clutch 44 and the turbine lock up clutch 50 are both coupled to the ring gear 26. Accordingly, the engine 12 transmits power to all of the devices of the vehicle. In particular, the engine 12 transmits power to the transmission 16 to drive the wheels of the vehicle via the driveline output 52. Additionally, the engine 12 transmits power through the ring gear 26 to each of the ancillary devices and the low voltage electronics 42 via the input accessory motor 38 and the low voltage energy storage 40. During the driving, operation 66, the input accessory motor functions as a generator driven by the engine 12.

Figure 6:
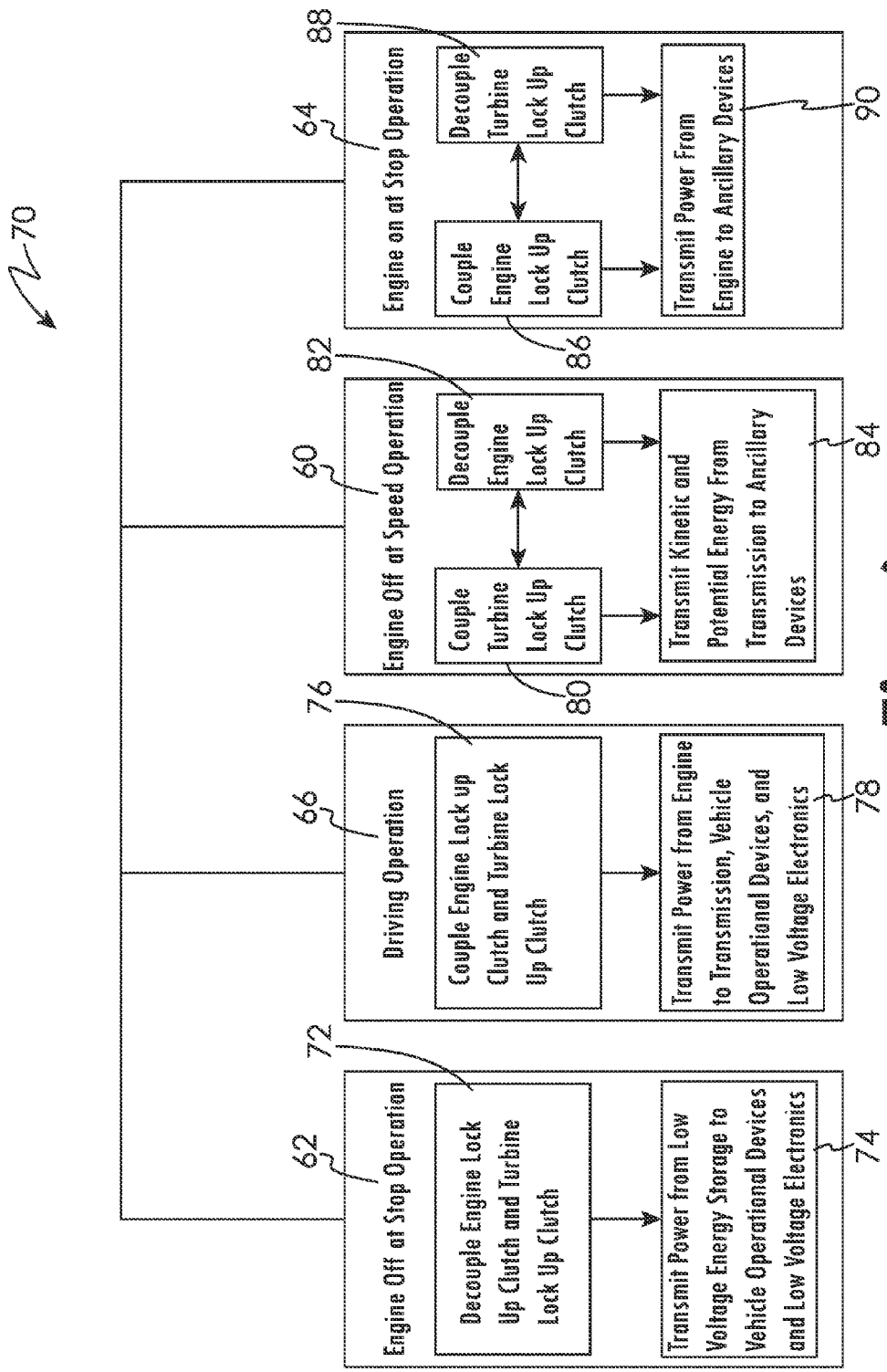
FIG. 6 illustrates a method for operating the powertrain architecture shown in FIG. 1.

A method 70 for operating the powertrain architecture 10 in various modes is illustrated in FIG. 6. The method 70 includes operating the powertrain architecture 10 in the engine off at stop operation 62 when the vehicle is stopped and the engine is not fueled, including the step 72 of decoupling the engine lock up clutch 44 and the turbine lock up clutch 50 from the ring gear 26. In step 74, power is transmitted from the low voltage energy storage 40 to power the low voltage electronics 42. The low voltage energy storage 40 also powers the ancillary devices by causing the input accessory motor 38 to rotate the ring gear 26 to provide power to the ancillary devices, so that they may operate without power from the engine 12. The method 70 also includes operating the powertrain architecture 10 in the driving operation 66 when the vehicle is accelerating, cruising, or climbing, or other situations in which the engine 12 is fueled, including the step 76 of coupling both the engine lock up clutch 44 and the turbine lock up clutch 50 to the ring gear 26. In step 78, power is transmitted from the engine 12 to ancillary devices, the low voltage electronics 42, and the transmission 16 to allow the ancillary devices and electronics 42 to be powered by the engine 12. The method 70 also includes operating the powertrain architecture 10 in the engine off at speed operation 60 when the vehicle is moving with the engine 12 unfueled, including the step 80 of coupling the turbine lock up clutch 50 to the ring gear 26 and the step 82 of decoupling the engine lock up clutch 44 from the ring gear 26. At step 84, kinetic energy of the vehicle are transmitted from the transmission 16 to the ancillary devices through the rotation of the ring gear 26 by the transmission 16. The method 70 also includes operating the powertrain architecture 10 in the engine on at stop operation 64, including the step 86 of coupling the engine lock up clutch 44 to the ring gear 26 and the step 88 of decoupling the turbine lock up clutch 50 from the ring gear 26. At step 90 power is transmitted from the engine 12 to the ancillary devices through the ring gear 26.

Figure 7:
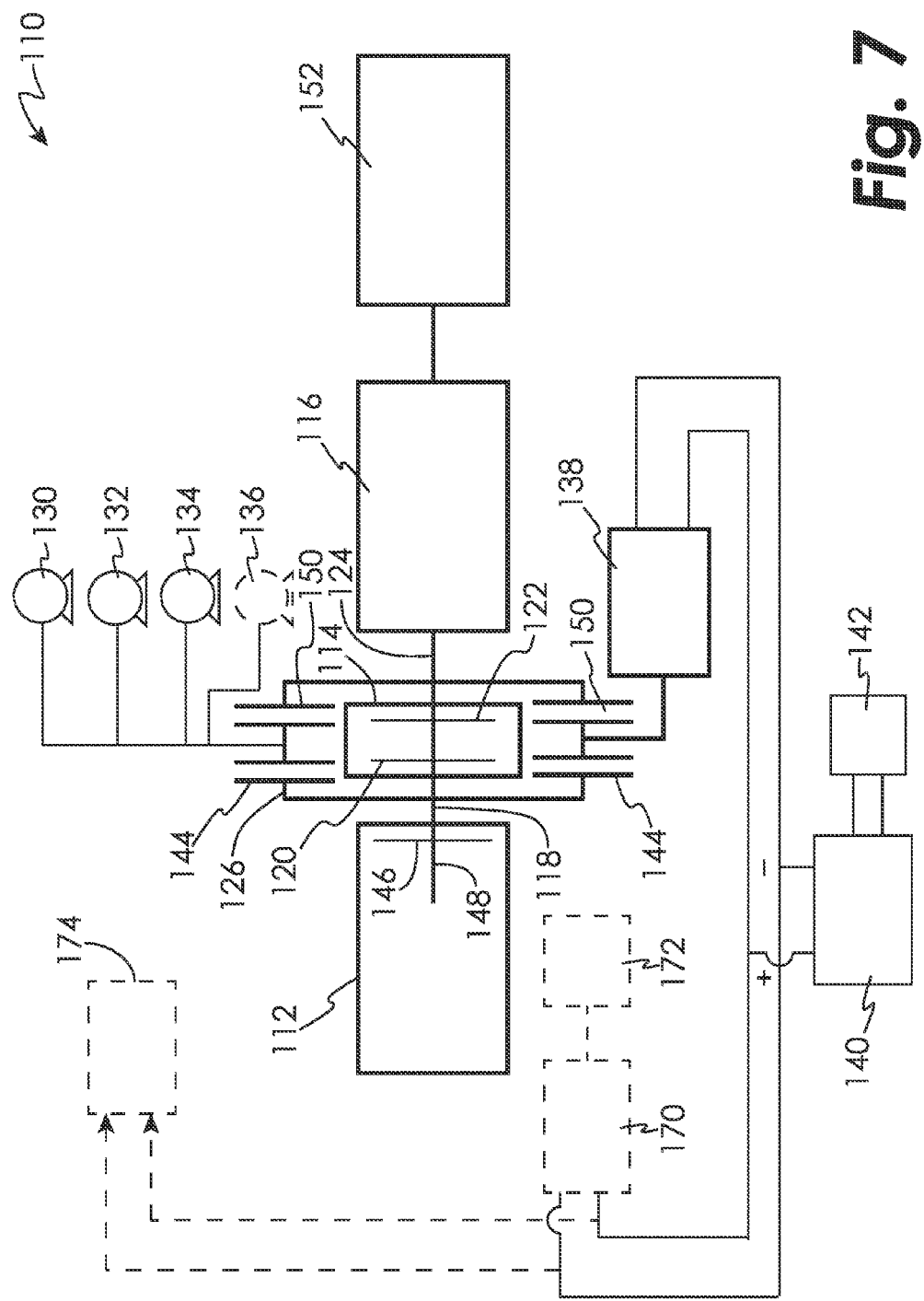
FIG. 7 is a schematic illustration of a another embodiment of a powertrain architecture formed in accordance with an embodiment.

FIG. 7 is a schematic illustration of another embodiment of a powertrain architecture 110 having an engine 112, a launch device 114, and transmission 116. The engine 112 includes a crankshaft 148 and a flywheel 146 that are caused to rotate by combustion within the engine 112. An output shaft 118 of the engine 112 is mechanically coupled to the launch device 114. In an exemplary embodiment, the launch device 114 is a torque converter used to transfer rotating power from the engine 112 to the transmission 116. An impeller 120 of the torque converter is mechanically coupled to the engine 112, and a turbine 122 of the torque converter is mechanically coupled to the transmission 116, as is known in the art. In particular, an input shaft 124 of the transmission 116 is mechanically coupled to turbine 122 to receive power therefrom during normal powered operation of the powertrain 10, whereby the engine 112 delivers power to the transmission 116 and the transmission 116 delivers the power to a driveline output 152 that is coupled to wheels (not shown) of the vehicle.

A ring gear 126 at least partially surrounds the launch device 114. The ring gear 126 is mechanically coupled to a plurality of ancillary devices. The ancillary devices include, but are not limited to, a transmission pump 130, an air brake compressor 132, a power steering pump 134, and an HVAC compressor 136. Additionally, the ancillary devices include an input accessory motor 138 mechanically coupled to the ring gear 126. A low voltage energy storage 140, for example a battery, is electrically coupled to the input accessory motor 138. Low voltage electronics 142 within the vehicle are powered by the low voltage energy storage 140. Additional ancillary devices, such as a turbocharger motor 170, a turbocharger 172, and an exhaust system heater 174, are provided. The turbocharger motor 170 and the exhaust system heater 174 are electrically coupled to the low voltage energy storage 140. The turbocharger 172 either is driven by the engine exhaust gas to rotate and turn the turbocharger motor 170 (thereby generating electricity that is stored in the low voltage energy storage 140) or electricity in the low voltage energy storage 140 is used to drive the turbocharger motor 170 and thereby turn the turbocharger 172 to provide more airflow to the engine (in situations where the exhaust airflow is not high enough to operate the turbocharger 172 at the desired speed). The turbocharger 172 is configured to provide additional airflow to the engine 112 to increase a rate of combustion within the engine 112, as is known in the art.

A pair of lock up clutches are configured to selectively engage the ring gear 126 to alter a power source for the low voltage electronics 142 and the vehicle ancillary devices. An engine lock up clutch 144 selectively mechanically couples the ring gear 126 to the flywheel 146 (or other appropriate portion) of the engine 112. Additionally, a turbine lock up clutch 150 selectively mechanically couples the ring gear 126 to the turbine 122 of the launch device 114 (or other appropriate portion of the transmission). The embodiments described below illustrate the various configurations in which the low voltage electronics 142 mid the vehicle ancillary devices are powered by the powertrain architecture 110. An electronic control system (not shown) is utilized to control the engine lock up clutch 144 and the turbine lock up clutch 150 to select the power source of the powertrain architecture 110.

Figure 8:
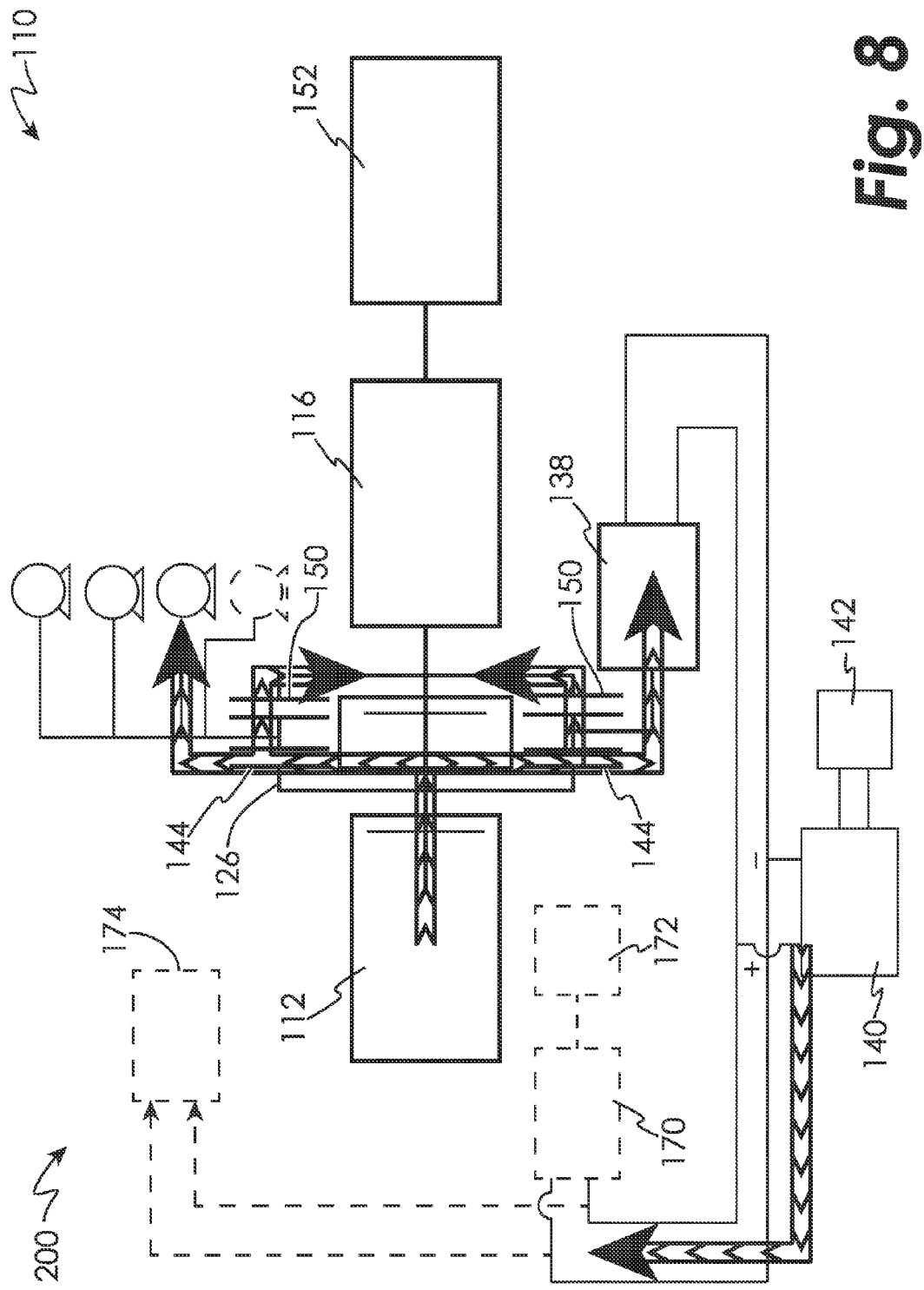
FIG. 8 is a schematic illustration of the powertrain architecture shown in FIG. 7 showing power flows during an acceleration operation.

FIG. 8 is a schematic illustration of an acceleration operation 200 of the powertrain architecture 110. It will be appreciated from the discussion of FIG. 8 and FIG. 9 below that in some embodiments the powertrain architecture 110 including a turbocharger 172 is operated in differing modes depending upon whether the vehicle is accelerating or cruising. In the acceleration operation 200, the engine lock up clutch 144 and the turbine lock up clutch 150 are coupled to the ring gear 126. The engine 112 powers the transmission 116 as well as the ancillary devices and the input accessory motor 138. In the exemplary embodiment, the input accessory motor 138 and/or the low voltage energy storage 140 provides power to the low voltage electronics 142 as well as the turbocharger motor 170. During acceleration of the vehicle, particularly from low rpm engine operating points, the turbocharger 172 may not be spinning last enough to generate the desired turbocharger boost. In such a situation, the low voltage energy storage 140 may be used to power the turbocharger motor 170 to drive the turbocharger 172 at a higher rpm, thereby generating additional turbocharger boost for the acceleration operation.

Figure 9:
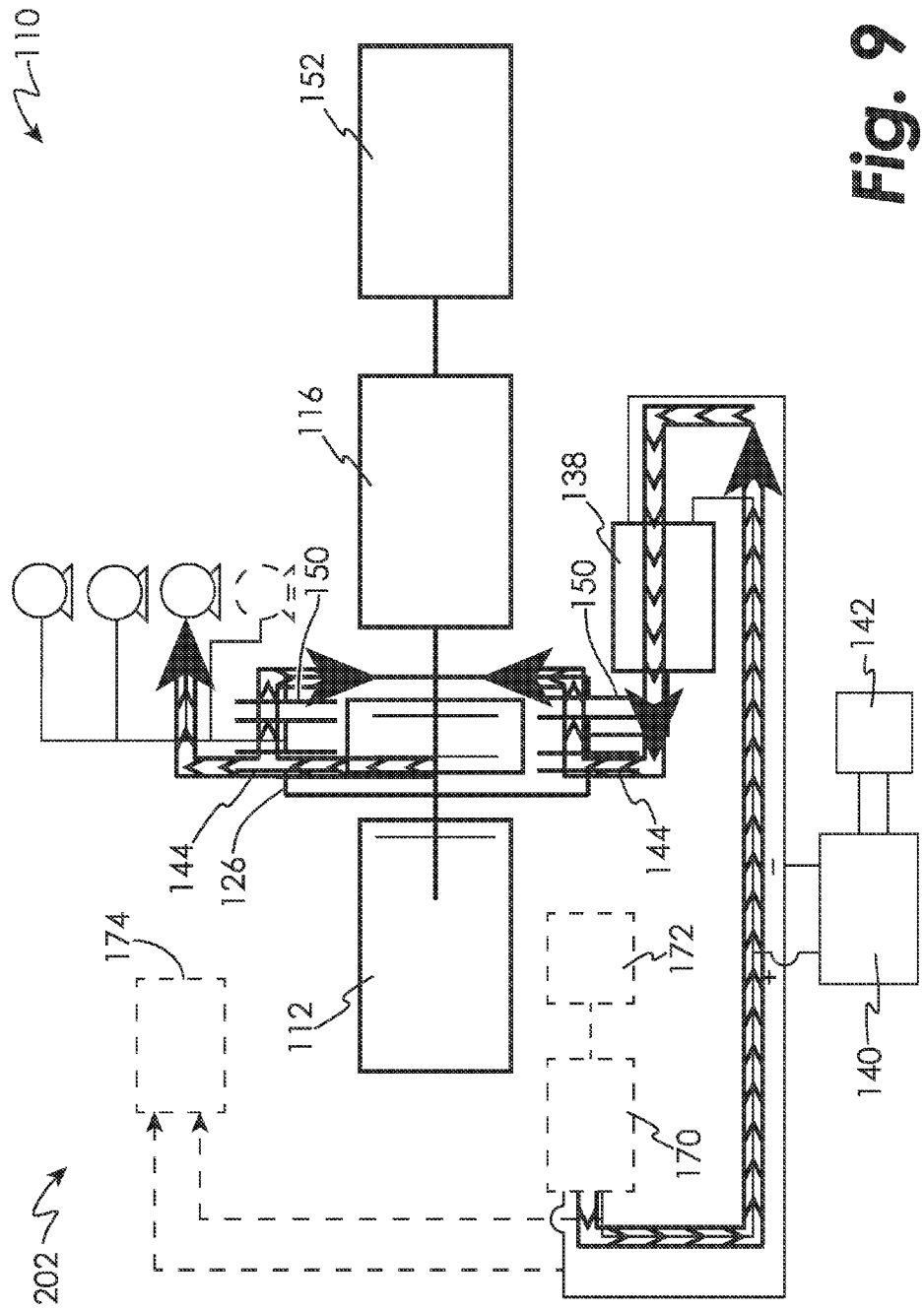
FIG. 9 is a schematic illustration of the powertrain architecture shown in FIG. 7 showing power flows during a cruise operation.

FIG. 9 is a schematic illustration of a cruise operation 202 of the powertrain architecture 110. In the cruise operation 202, the engine lock up clutch 144 and the turbine lock up clutch 150 are coupled to the ring gear 126 and the vehicle is moving under power from the engine 112, but is not accelerating above a predetermined threshold. The engine 112 powers the transmission 116 as well as the ancillary devices. However, in the cruise operation 202, the input accessory motor 138 shifts from receiving power from the ring gear 126 to transmitting power to the ring gear 126. In particular, the turbocharger motor 170, driven by rotation of the turbocharger 172 by exhaust gases from the engine 112, supplies power to the input accessory motor 138, causing rotation of the input accessory motor which is then transmitted via the ring gear 126. In the cruise, operation 202, the rotational energy of the turbocharger 172 that is not needed to provide boost pressure to the engine 112 intake may be used to provide additional rotational power to the ring gear 126.

Figure 10:
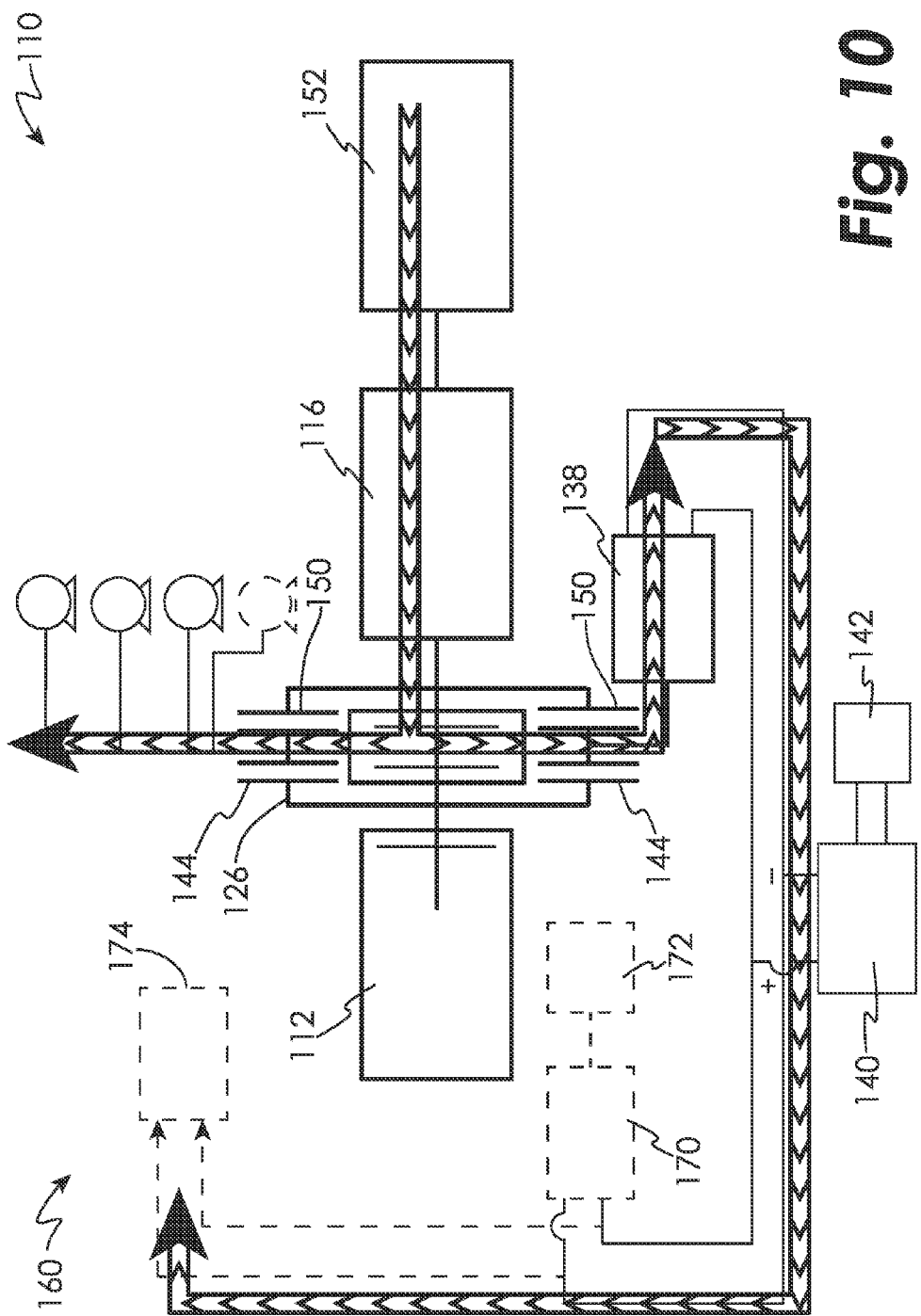
FIG. 10 is a schematic illustration of the powertrain architecture shown in FIG. 7 showing power-flows during an engine off while moving operation.

FIG. 10 is a schematic illustration of an engine off at speed operation 160 of the powertrain architecture 110. The engine off at speed operation 160 occurs when the vehicle is descending a grade but engine braking is not commanded (either automatically, such as when indicated by an inclinometer or, alternatively, manually by the operator of the vehicle). In the engine off at speed operation 160, the engine lock up clutch 144 is disengaged from the ring gear 126 and the turbine lock up clutch 150 engages the ring gear 126 to transmit kinetic energy from the transmission 116 to the vehicle ancillary devices and the input accessory motor 138. The input accessory motor 138, driven by the ring gear 126, functions as a generator to send electrical power to the low voltage energy storage 140 and/or the exhaust system heater 174. The exhaust system heater 174 is used to maintain the desired temperature of exhaust system components, such as a diesel particulate filter or a selective catalytic reduction (SCR) system, to name just two non-limiting examples. The exhaust system healer 174 may be needed when the engine 112 is not fueled and is therefore not producing hot exhaust gases that would otherwise maintain the desired temperature of the exhaust system.

Figure 11:
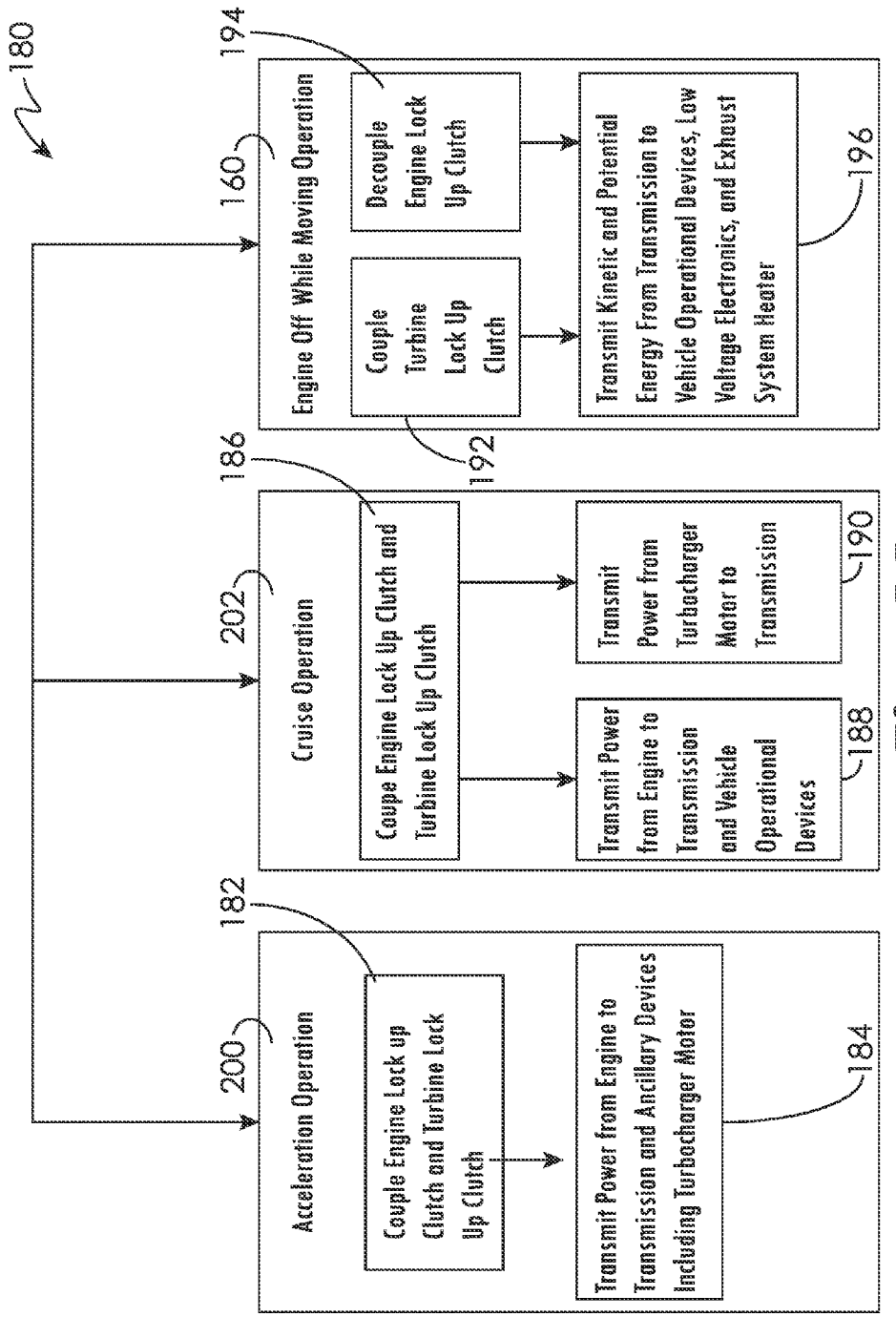
FIG. 11 illustrates a method for operating the powertrain architecture shown in FIG. 7.

A method 180 for operating the powertrain architecture 110 in various modes is illustrated in FIG. 11. The method 180 includes operating the powertrain architecture 110 in the acceleration operation 200 when the engine is fueled and the vehicle is accelerating, including the step 182 of coupling the engine lock up clutch 144 and the turbine lock up clutch 150 to the ring gear 126. At step 184, power is transmitted from the engine 112 to the transmission 116 and the ancillary devices, including the turbocharger motor 170, The turbocharger motor 170 is used to drive the turbocharger 172 at a higher rpm, thereby generating additional turbocharger boost for the acceleration operation.

The method 180 also includes operating the powertrain architecture 110 in the cruise operation 202 when the vehicle is moving under power from the engine 112, but is not accelerating above a predetermined threshold. The cruise operation 202 includes the step 186 of coupling the engine lock up clutch 144 and the turbine lock up clutch 150 to the ring gear 126. At step 188 power is transmitted from the engine 112 to the transmission 116 the vehicle ancillary devices. At step 190, power is also transmitted from the turbocharger motor 170, driven by the turbocharger 172, to the to the transmission 116 through the input accessory motor 138 and the ring gear 126.

The method 180 also includes operating the powertrain architecture 110 in the engine off at speed operation 160 when the engine is off but engine braking is not commanded, including the step 192 of coupling the turbine lock up clutch 150 to the ring gear 126 and the step 194 of decoupling the engine lock up clutch 144 from the ring gear 126, At step 196 kinetic energy are transmitted from the transmission 116 to the ancillary devices, low voltage electronics 142 and/or the exhaust system heater 174 to make up for the loss of heat from cessation of engine combustion exhaust gas flow.

Figure 12:
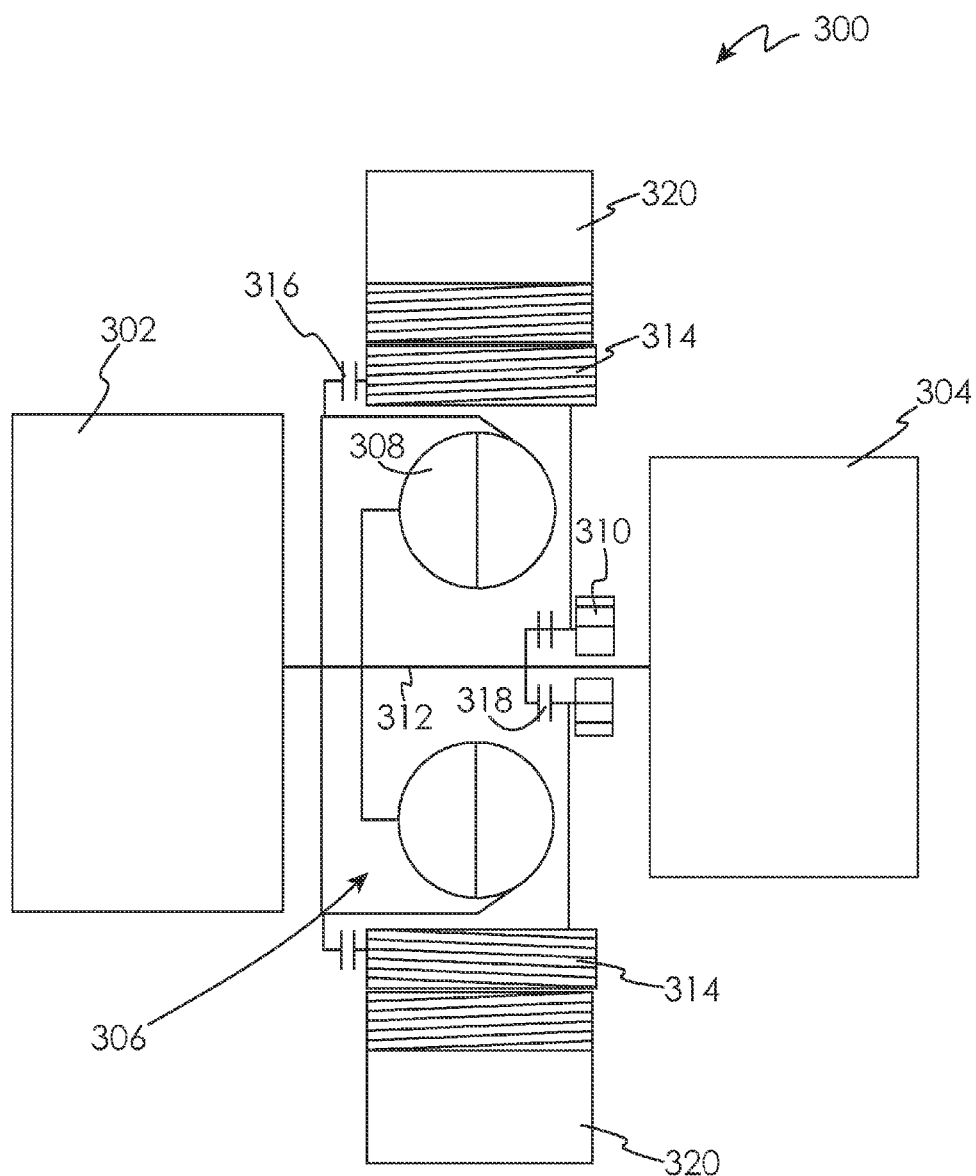
FIG. 12 is a schematic illustration of a ring gear assembly formed in accordance with an embodiment.

FIG. 12 schematically illustrates one embodiment of a ring gear assembly 300 that may be used to couple an engine 302 and a transmission 304 to a ring gear 314. The ring gear assembly 300 may be used with either of the powertrain architectures 30 or 110. A launch device 306 couples the engine 302 and the transmission 304. The launch device 306 includes a torque converter 308 that is configured to couple to the engine 302 and the transmission 304 through the turbine 312. The torque converter 308 and a transmission pump 310 are positioned within the ring gear 314. An engine lock up clutch 316 is configured to selectively couple the engine 302 to the ring gear 314. A turbine lock up clutch 318 is configured to selectively couple, the turbine 312 to the transmission pump 310 and the ring gear 314. Ring gear driven accessories 320 are joined to the ring gear 314 using intermeshed gears.

During operation, the engine lock up clutch 316 couples the engine 302 to the ring gear 314 to start the powertrain architecture with ail ancillary devices being operational. The powertrain architecture is launched by the torque converter 308 until a torque converter lock up mode is required. At this time, the turbine lock up clutch 318 couples the transmission 304 to the ring gear 314 to provide a fixed gear transmission. When the vehicle slows down or stops, the engine lock up clutch 316 decouples the engine 302 from the ring gear 314 and the turbine lock up clutch 318 decouples the transmission 304 from the ring gear 314. The engine 302 and the transmission 304 are stopped at zero revolutions per minute (RPM). The ring gear 314 continues to rotate to provide power to the ancillary devices via the input accessory motor. The ring gear 314 also provides hydraulic system pressure to the transmission 304 via the transmission pump 310. The hydraulic system pressure enables the transmission 304 to be restarted from zero RPMs when the vehicle begins moving again and the turbine lock up clutch 318 couples the transmission 304 to the ring gear 314.

The ring gear assembly 300 takes into account limited space within the powertrain architecture. Accordingly, the torque converter 308 is positioned within the ring gear 314 to limit the length of the powertrain architecture.

Figure 13:
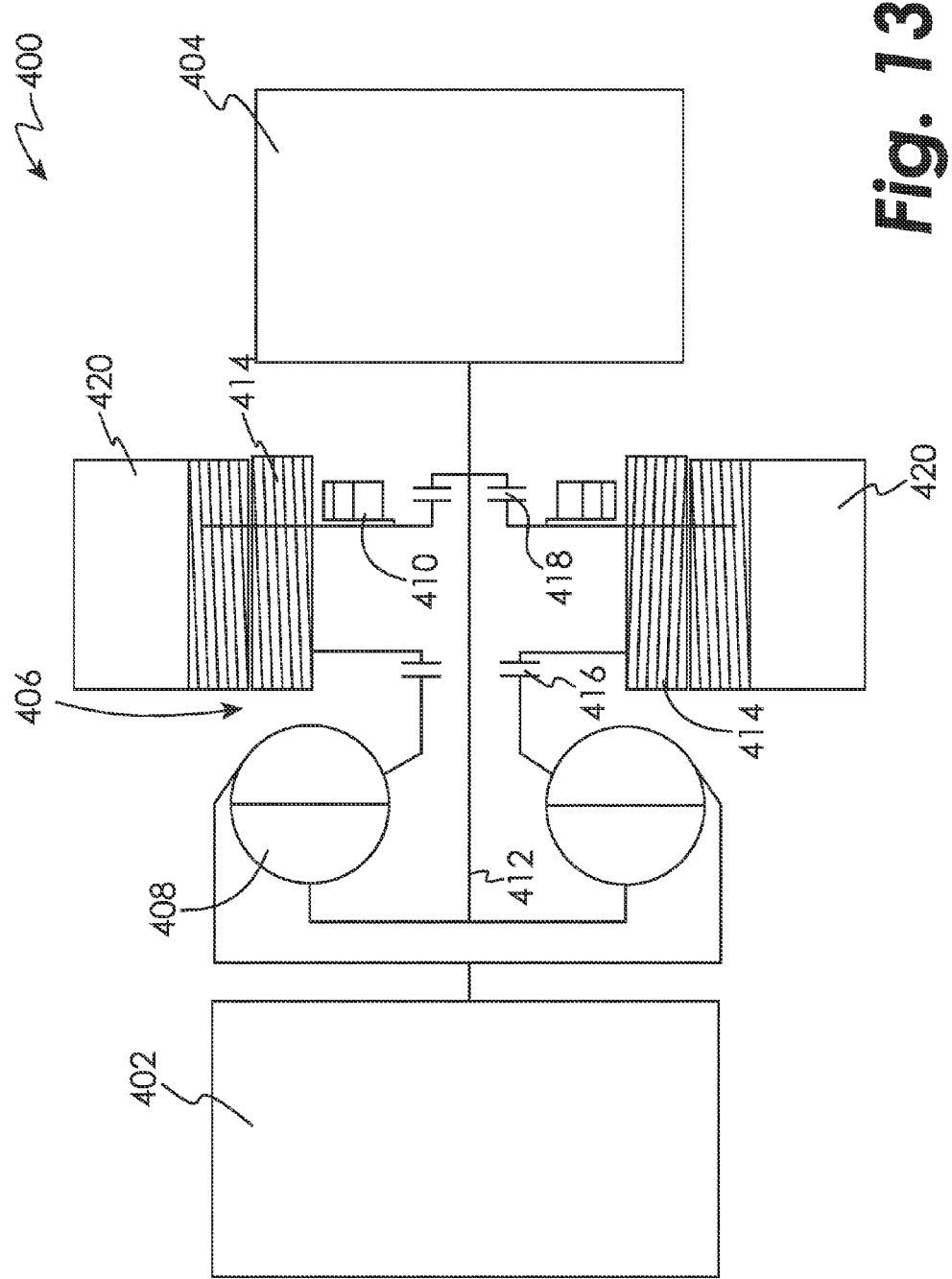
FIG. 13 is a schematic illustration of a ring gear assembly formed in accordance with an embodiment.

FIG. 13 schematically illustrates another embodiment of a ring gear assembly 400 that may be utilized when the length of the powertrain architecture is not a limiting design factor. The ring gear assembly 400 couples an engine 402 and a transmission 404 to a ring gear 414. The ring gear assembly 400 may be used with either of the powertrain architectures 10 or 110. A launch device 406 couples the engine 402 and the transmission 404. The launch device 406 includes a torque converter 408 that is configured to couple to the engine 402 and the transmission 404 through the turbine 412. Because the length of the powertrain architecture is not a limiting design factor, the torque converter 408 is positioned outside of the ring gear 414. This positioning enables the ring gear 414 to be sized so as to maintain a desired diameter ratio between the ring gear 414 and other gears within the powertrain architecture. A transmission pump 410 is positioned within the ring gear 414 and is powered by the rotation of the ring gear 414. An engine lock up clutch 416 is configured to selectively couple the engine 402 to the ring gear 414 via the torque converter 408. A turbine lock up clutch 418 is configured to selectively couple the turbine 412 to the pump 410 and the ring gear 414. Ring gear driven accessories 420 are joined to the ring gear 414.

Figure 14:
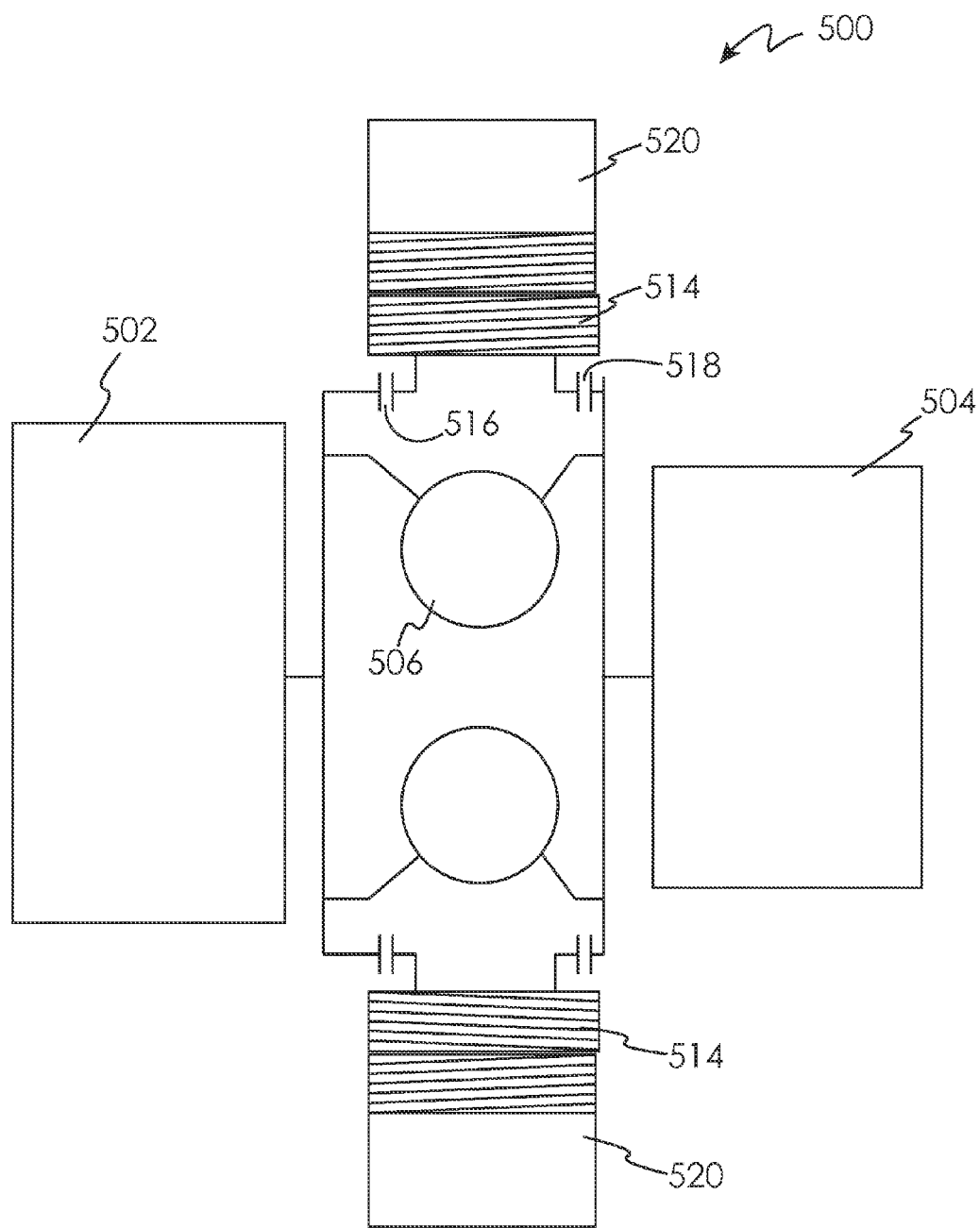
FIG. 14 is a schematic illustration of a ring gear assembly formed in accordance with an embodiment.

FIG. 14 schematically illustrates a ring gear assembly 500 used to couple an engine 502 and a transmission 504 to a ring gear 514. The ring gear assembly 500 may be used with either of the powertrain architectures 10 or 110. The ring gear assembly 500 illustrates an embodiment, wherein the torque converter may be replaced by another suitable launch device. The launch device 506, for example a variator to name one non-limiting example, couples the engine 502 and the transmission 504. The launch device 506 is positioned within the ring gear 514. An engine lock up clutch 516 is configured to selectively couple the engine 502 to the ring gear 514. A turbine lock up clutch 518 is configured to selectively couple the transmission 504 to the ring gear 514. Ring gear driven accessories 520 are joined to the ring gear 514.

The powertrain architecture 10 or 110 can be integrated with a wide range of power and energy levels and with multiple motor sizes. The powertrain architectures 10 and 110 provide the ability to recover waste energy and put that energy to use by, variously, mechanically driving accessory devices, generating electricity to drive accessory devices, and/or generating electricity to be stored. The powertrain architectures 10 and 110 optimize the usage of vehicle potential energy, kinetic energy, waste energy, and low voltage system energy to achieve improvements in fuel economy, efficiency and emissions reduction. The waste energy electricity is used to offset electrical accessory loads and to reduce the power taken from the powertrain by the input accessory motor, to add power to the transmission accessory power shaft to offset system hydraulic accessory loads, and to blend power with the engine output power in order to boost powertrain efficiency. Accordingly, the systems and methods disclosed herein recover vehicular waste energy and deliver it back into vehicle propulsion, reduced emissions, and fuel efficiency.

While this disclosure has been described using disclosed embodiments, the systems and methods according to the present disclosure can be further modified within the scope and spirit of this disclosure. This application is therefore intended to cover any variations, uses, or adaptations of the disclosure using its general principles. For example, the methods disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation tails within the scope of the present disclosure as disclosed herein and in the appended claims. Furthermore, this application is intended to cover such departures from the present disclosure as come within known or customary practice in the art to which this disclosure pertains and which fell within the limits of the appended claims.

What is claimed is:

1. A powertrain architecture comprising:
   an engine;
   a transmission;
   a launch device configured to be selectively mechanically coupled to the engine and to the transmission;
   a ring gear positioned at least partially radially around the launch device;
   an engine lock up clutch operative to selectively directly mechanically couple the engine to the ring gear;
   a turbine lock up clutch operative to selectively directly mechanically couple the transmission to the ring gear; and
   at least one ancillary device coupled to the ring gear for receiving power from or transmitting power to the ring gear.

2. The powertrain architecture of claim 1, wherein the engine lock up clutch mechanically couples the engine to the ring gear and the turbine lock up clutch mechanically couples the transmission to the ring gear to transmit power from the engine to the at least one ancillary device and to the transmission.

3. The powertrain architecture of claim 1, wherein the engine lock up clutch mechanically couples the engine to the ring gear and the turbine lock up clutch mechanically uncouples the transmission from the ring gear, wherein power is transmitted from the engine to the at least one ancillary device through the ring gear.

4. The powertrain architecture of claim 1 further comprising a low voltage energy storage electrically coupled to at least one of the at least one ancillary device, wherein the engine lock up clutch mechanically uncouples the engine from the ring gear and the turbine lock up clutch mechanically uncouples the transmission from the ring gear, wherein power is transmitted from the low voltage energy storage to the at least one of the at least one ancillary device.

5. The powertrain architecture of claim 1, wherein the engine lock up clutch mechanically uncouples the engine from the ring gear and the turbine lock up clutch mechanically couples the transmission to the ring gear, wherein kinetic energy is transmitted from the transmission to the at least one ancillary device.

6. The powertrain architecture of claim 1, wherein the at least one ancillary device is coupled to the ring gear for both receiving power from and transmitting power to the ring gear.

7. The powertrain architecture of claim 1, wherein the at least one ancillary device includes an input accessory motor, the powertrain architecture further comprising:
   a low voltage energy storage electrically coupled to the input accessory motor; and
   a turbocharger motor electrically coupled to the input accessory motor.

8. The powertrain architecture of claim 7, wherein:
   the engine lock up clutch mechanically couples the engine to the ring gear;
   the turbine lock up clutch mechanically couples the transmission to the ring gear to transmit power from the engine to the transmission and the at least one ancillary device; and
   the low voltage energy storage transmits power to the turbocharger motor.

9. The powertrain architecture of claim 7, wherein:
   the engine lock up clutch mechanically couples the engine to the ring gear;
   the turbine lock up clutch mechanically couples the transmission to the ring gear to transmit power from the engine to the transmission and the at least one ancillary device; and
   the turbocharger motor transmits power to the transmission and the at least one ancillary device.

10. The powertrain architecture of claim 7, further comprising:
    an exhaust system heater, wherein:
    the turbine lock up clutch mechanically couples the transmission to the ring gear;
    the engine lock up clutch mechanically uncouples the engine from the ring gear to transmit kinetic energy from the transmission to the at least one ancillary device; and
    the input accessory motor transmits energy to the exhaust system heater.

11. A dual lock up clutch system comprising:
    a ring gear positioned radially around a launch device configured to be selectively mechanically coupled to an engine and to a transmission;
    an engine lock up clutch operative to selectively directly mechanically couple the engine to the ring gear;

a turbine lock up clutch operative to selectively directly mechanically couple the transmission to the ring gear; and at least one ancillary device coupled to the ring gear for receiving power from or transmitting power to the ring gear.

12. The system of claim 11, wherein the engine lock up clutch mechanically couples the engine to the ring gear and the turbine lock up clutch mechanically couples the transmission to the ring gear to transmit power from the engine to the at least one ancillary device and to the transmission.

13. The system of claim 11, wherein the engine lock up clutch mechanically couples the engine to the ring gear and the turbine lock up clutch mechanically uncouples the transmission from the ring gear, wherein power is transmitted from the engine to the at least one ancillary device through the ring gear.

14. The system of claim 11 further comprising a low voltage energy storage electrically coupled to at least one of the at least one ancillary device, wherein the engine lock up clutch mechanically uncouples the engine from the ring gear and the turbine lock up clutch mechanically uncouples the transmission from the ring gear, wherein power is transmitted from the low voltage energy storage to the at least one of the at least one ancillary device.

15. The system of claim 11, wherein the engine lock up clutch mechanically uncouples the engine from the ring gear and the turbine lock up clutch mechanically couples the transmission to the ring gear, wherein kinetic energy is transmitted from the transmission to the at least one ancillary device.

16. The system of claim 11, wherein the at least one ancillary device includes an input accessory motor, the powertrain architecture further comprising:
a low voltage energy storage electrically coupled to the input accessory motor; and
a turbocharger motor electrically coupled to the input accessory motor.

17. The system of claim 16, wherein:
the engine lock up clutch mechanically couples the engine to the ring gear;
the turbine lock up clutch mechanically couples the transmission to the ring gear to transmit power from the engine to the transmission and the at least one ancillary device; and
the low voltage energy storage transmits power to the turbocharger motor.

18. The system of claim 16, wherein:
the engine lock up clutch mechanically couples the engine to the ring gear;
the turbine lock up clutch mechanically couples the transmission to the ring gear to transmit power from the engine to the transmission and the at least one ancillary device; and
the turbocharger motor transmits power to the transmission and the at least one ancillary device.

19. The system of claim 16, further comprising:
an exhaust system heater, wherein:
the turbine lock up clutch mechanically couples the transmission to the ring gear;
the engine lock up clutch mechanically uncouples the engine from the ring gear to transmit kinetic energy from the transmission to the at least one ancillary device; and
the input accessory motor transmits energy to the exhaust system heater.

20. A method of powering at least one ancillary device of a vehicle, the vehicle including an engine, a transmission, and a launch device configured to be selectively mechanically coupled to the engine and to the transmission, the method comprising:
selectively directly mechanically coupling the engine to a ring gear that is radially positioned around the launch device;
selectively directly mechanically coupling the transmission to the ring gear; and
coupling the at least one ancillary device to the ring gear for receiving power from or transmitting power to the ring gear.

21. The method of claim 20, wherein the engine is mechanically coupled to the ring gear by an engine lock up clutch.

22. The method of claim 20, wherein the transmission is coupled to the ring gear by a turbine lock up clutch.

23. The method of claim 20 further comprising:
mechanically coupling the engine to the ring gear;
mechanically coupling the transmission to the ring gear; and
transmitting power from the engine to the at least one ancillary device and to the transmission through the ring gear.

24. The method of claim 20 further comprising:
mechanically coupling the engine to the ring gear;
mechanically uncoupling the transmission from the ring gear; and
transmitting power from the engine to the at least one ancillary device through the ring gear.

25. The method of claim 20 further comprising:
mechanically uncoupling the engine from the ring gear;
mechanically uncoupling the transmission from the ring gear; and
transmitting power from a low voltage energy storage to the at least one ancillary device through the ring gear.

26. The method of claim 20 further comprising:
mechanically uncoupling the engine from the ring gear;
mechanically coupling the transmission to the ring gear; and
transmitting kinetic energy from the transmission to the at least one ancillary device through the ring gear.

27. The method of claim 20 further comprising:
mechanically coupling the engine to the ring gear;
mechanically coupling the transmission to the ring gear;
transmitting power from the engine to the transmission and the at least one ancillary device through the ring gear; and
transmitting power from a low voltage energy storage to a turbocharger motor.

28. The method of claim 20 further comprising:
mechanically coupling the engine to the ring gear;
mechanically coupling the transmission to the ring gear;
transmitting power from the engine to the transmission and the at least one ancillary device through the ring gear; and
transmitting power from a turbocharger motor to the transmission and the at least one ancillary device through the ring gear.

29. The method of claim 20 further comprising:
mechanically coupling the transmission to the ring gear;
mechanically uncoupling the engine from the ring gear;
transmitting kinetic energy from the transmission to the at least one ancillary device through the ring gear; and
transmitting energy from an input accessory motor to an exhaust system heater.

* * * * *

UNITED STATES PATENT AND TRADEMARK OFFICE
CERTIFICATE OF CORRECTION

PATENT NO. : 9,352,738 B2  
APPLICATION NO. : 13/955567  
DATED : May 31, 2016  
INVENTOR(S) : Jonathan Kellerman et al.

It is certified that error appears in the above-identified patent and that said Letters Patent is hereby corrected as shown below:

On the Title Page

Item (72) Inventors, should read:
--Jonathan Kellerman, Indianapolis, IN (US); Charles F. Long, Bonita Springs, Florida; (US); Stephen C. West, Tucson, Arizona (US);--

Signed and Sealed this  
Twentieth Day of August, 2019

Andrei Iancu  
*Director of the United States Patent and Trademark Office*